US007120709B2

United States Patent
Isobe et al.

(10) Patent No.: US 7,120,709 B2
(45) Date of Patent: Oct. 10, 2006

(54) DISK-ARRAY DEVICE HAVING STORAGE-DEVICE RECOGNITION AND INDENTIFICATION OF A STORAGE AREA NETWORK LINK ENVIRONMENT

(75) Inventors: Itaru Isobe, Odawara (JP); Katsuhiro Uchiumi, Fujisawa (JP); Yuki Maeda, Odawara (JP); Naoki Futawatari, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 83 days.

(21) Appl. No.: 10/883,787

(22) Filed: Jul. 6, 2004

(65) Prior Publication Data
US 2006/0031606 A1 Feb. 9, 2006

(30) Foreign Application Priority Data
May 10, 2004 (JP) ............................. 2004-140224

(51) Int. Cl.
G06F 3/00 (2006.01)
(52) U.S. Cl. .......................... 710/38; 710/20; 709/233; 340/825
(58) Field of Classification Search .................... 710/5, 710/20, 29, 33, 38; 709/233; 712/400; 340/825
See application file for complete search history.

(56) References Cited

U.S. PATENT DOCUMENTS

| 5,884,047 | A  | * | 3/1999  | Aikawa et al. .............. 709/238 |
| 6,421,711 | B1 |   | 7/2002  | Blumenau et al. |
| 6,427,173 | B1 |   | 7/2002  | Boucher et al. |
| 6,499,056 | B1 |   | 12/2002 | Kitamura et al. |
| 6,606,690 | B1 |   | 8/2003  | Padovano |
| 6,745,234 | B1 |   | 6/2004  | Philyaw et al. |
| 6,775,230 | B1 |   | 8/2004  | Watanabe et al. |
| 2001/0054093 | A1 |   | 12/2001 | Iwatani |
| 2004/0103220 | A1 | * | 5/2004  | Bostick et al. .............. 709/253 |
| 2004/0176927 | A1 | * | 9/2004  | Chen et al. .................. 702/182 |
| 2004/0215764 | A1 | * | 10/2004 | Allen et al. .................. 709/224 |
| 2005/0125523 | A1 | * | 6/2005  | Hickerson et al. .......... 709/223 |

* cited by examiner

*Primary Examiner*—Kim Huynh
*Assistant Examiner*—Eron Sorrell
(74) *Attorney, Agent, or Firm*—Reed Smith LLP; Stanley P. Fisher, Esq.; Juan Carlos A. Marquez, Esq.

(57) ABSTRACT

A disk-array device includes an information managing database for acquiring link information among a server device, a switch device, and a storage device via the switch device so as to manage the link information in a combined manner, and a collection/analysis unit for retrieving and collecting desired combined information of the link information from the information managing database so as to analyze the desired combined information.

16 Claims, 12 Drawing Sheets

DIAGRAM FOR ILLUSTRATING COLLECTION OF HBA INFORMATION
BY STORAGE DEVICE OF PRESENT INVENTION

FIG.4 DIAGRAM FOR ILLUSTRATING CONFIGURATION OF FC SWITCH DEVICE

FIG.6

| No. | HBA | DRIVER | FC SWITCH DEVICE | FIRMWARE | EVALUATION | IN-OPERATION COUNT | PROBLEM-OCCURRENCE COUNT |
|---|---|---|---|---|---|---|---|
| 1 | | | | | OK | INCREMENT | |
| 2 | | | | | | | |
| 3 | | | | | | | |
| 4 | | | | | | | |
| 5 ..... | | | | | | | |

| 41 | 42 | 43 | 44 | 45 | 46 | 47 | 48 |

DIAGRAM FOR ILLUSTRATING COMBINATION TABLE OF HBA DRIVERS AND FIRMWARE OF FC SWITCH DEVICES

FIG.7

| 51 | 52 | 53 | 54 | 55 | 56 | 57 |
|---|---|---|---|---|---|---|
| OS | HBA FAMILY | HBA DRIVER | FC-SWITCH-DEVICE FAMILY | FC-SWITCH-DEVICE FIRMWARE | STATUS | COUNT |
| A | A | 5.2.1 | A | 3.0.2h | ALREADY VERIFIED | |
| | | 5.2.1 | | 3.1.1h | ALREADY VERIFIED | +1 |
| | | 5.3.0.7 | | 3.1.1h | ALREADY VERIFIED | |
| | | (5.3.0.7) | | (3.0.2h) | (PERFORMANCE-RECORD EXISTS) | +1 |
| | | (5.4) | | (3.2) | (UNSUPPORTED CONFIGURATION) | |

DIAGRAM FOR ILLUSTRATING EXAMPLE WHERE STATUS/COUNT FIELDS ARE ADDED TO EXAMPLE OF SUPPORT MATRIX

FIG.8

| 61 | 62 | 63 | 64 | 65 | 66 | 67 | 68 | 69 | 70 | 71 |
|---|---|---|---|---|---|---|---|---|---|---|
| HBA | HBA DRIVER | MICRO CODE | SERVER | FC-SWITCH-DEVICE FIRMWARE | FC-SWITCH-DEVICE CASCADE | STORAGE INTERFACE | STORAGE TOPOLOGY | HBA TOPOLOGY | STATUS CODE | NOTE |
| ××××00 1Gbps | UNDETERMINED | UNDETERMINED | UNDETERMINED | v4.1 | 3 | FIBRE 2 Gbps | F | F | GA | |
| ××××02 2Gbps | UNDETERMINED | UNDETERMINED | UNDETERMINED | v4.1 | 1 | FIBRE 2 Gbps | F | F | GA | |
| ××××02 2Gbps | UNDETERMINED | UNDETERMINED | UNDETERMINED | v4.0.2b | 1 | FIBRE 2 Gbps | F | F | GA | |
| ××××02-× 2Gbps | UNDETERMINED | UNDETERMINED | UNDETERMINED | v4.0.2b | 3 | FIBRE 2 Gbps | F | F | GA | |
| ××××40 | UNDETERMINED | UNDETERMINED | UNDETERMINED | v4.1 | | | | | | |
| PARTICULAR USER | | | | | | | | | | PAGE 1 |

DIAGRAM FOR ILLUSTRATING DISPLAYED EXAMPLE OF SUPPORT MATRIX

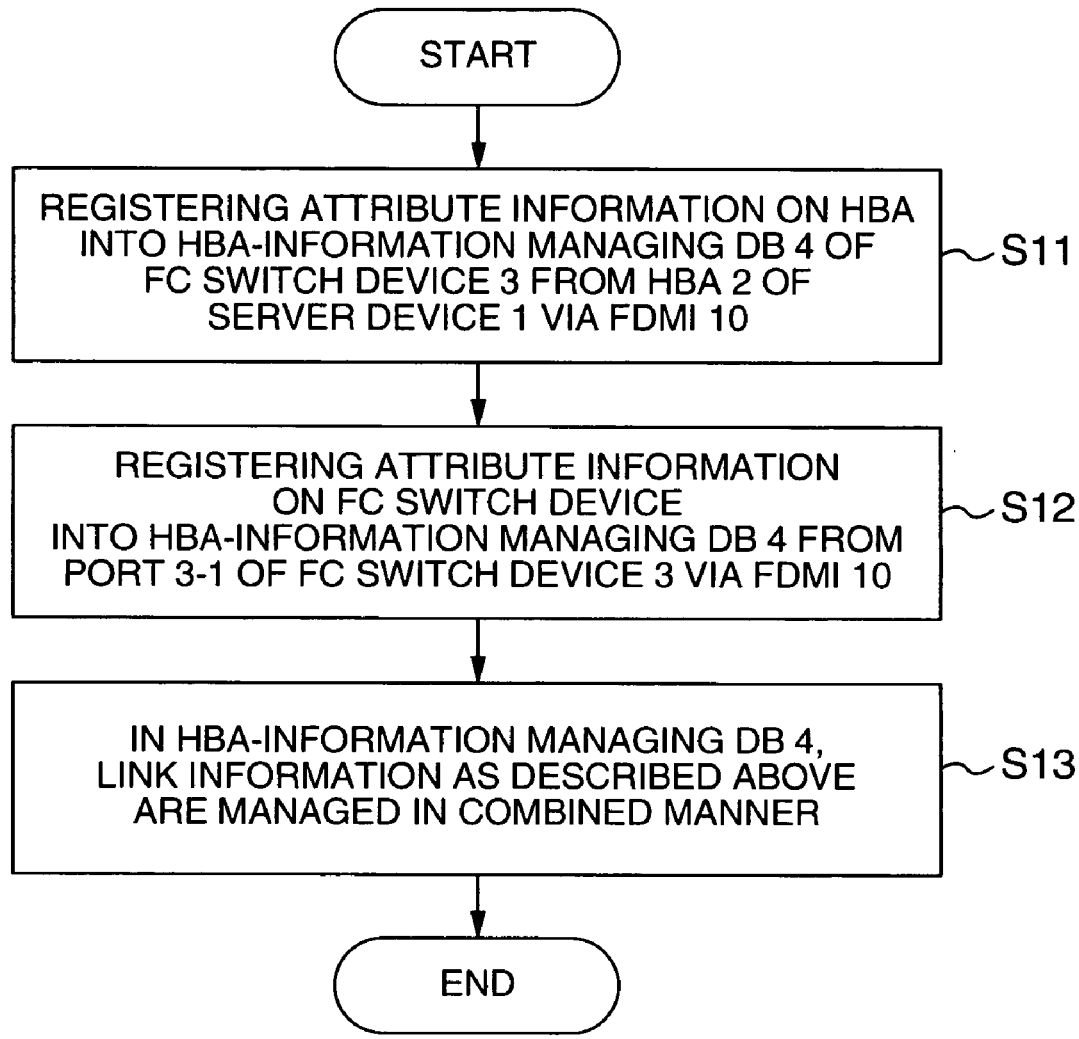
FLOWCHART FOR ILLUSTRATING REGISTRATION OPERATION OF ATTRIBUTE INFORMATION ON HBA AND ATTRIBUTE INFORMATION ON FC SWITCH DEVICE

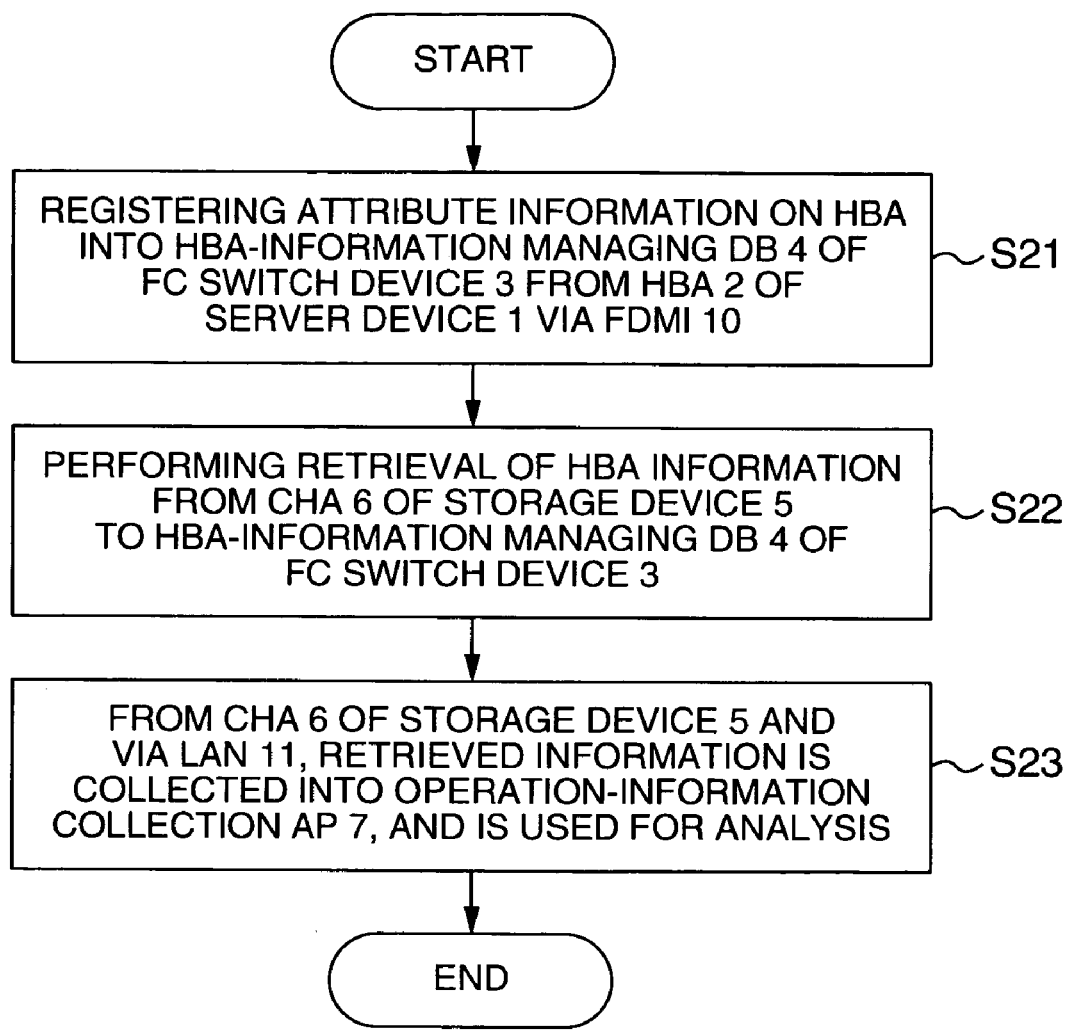
FLOWCHART FOR ILLUSTRATING COLLECTION OPERATION OF INFORMATION SUCH AS ATTRIBUTE INFORMATION ON HBA

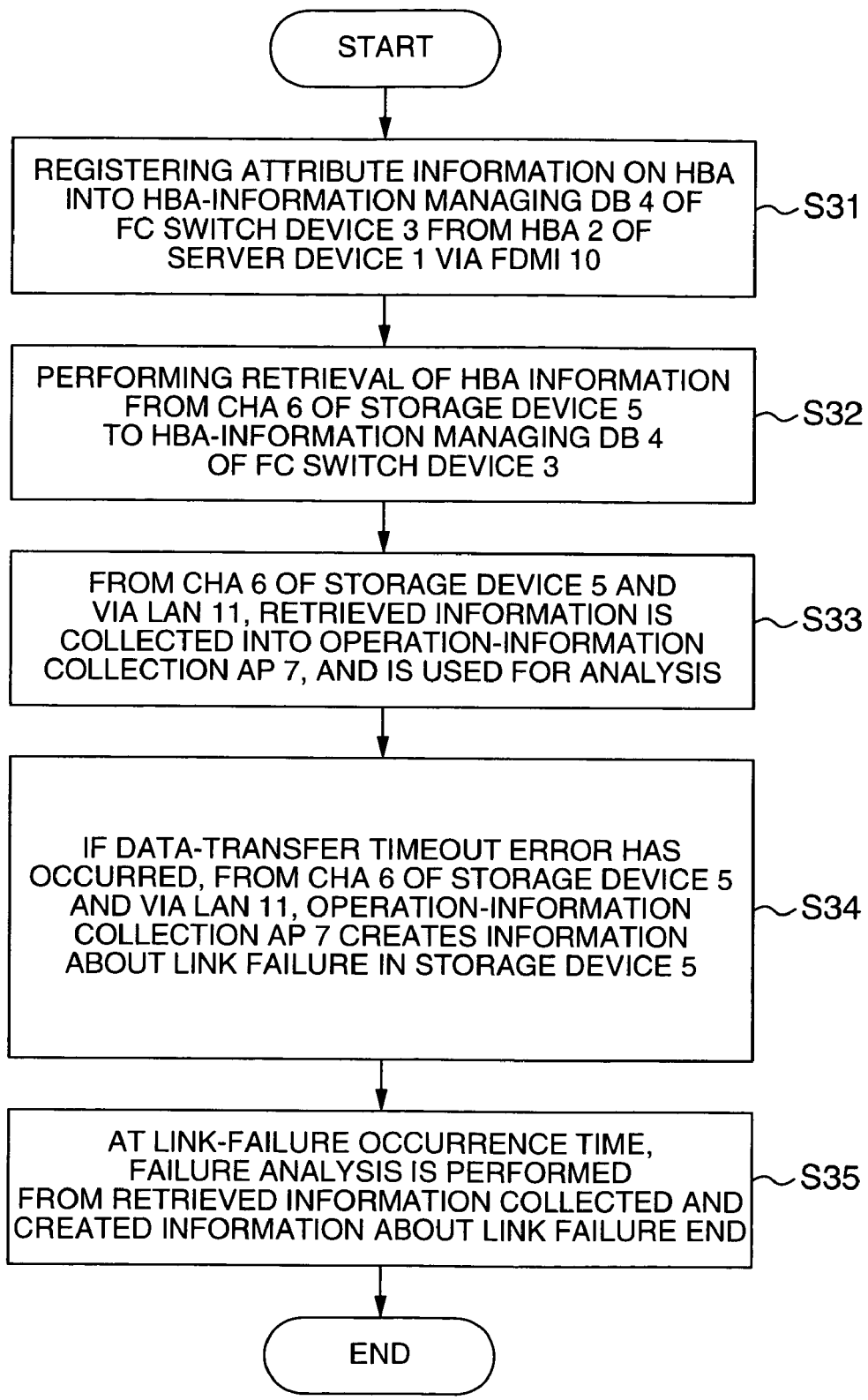

FLOWCHART FOR ILLUSTRATING CREATION OPERATION OF SUPPORT MATRIX

DISK-ARRAY DEVICE HAVING STORAGE-DEVICE RECOGNITION AND INDENTIFICATION OF A STORAGE AREA NETWORK LINK ENVIRONMENT

INCORPORATION BY REFERENCE

The present application claims priority from Japanese application JP 2004-140224 filed on May 10, 2004, the content of which is hereby incorporated by reference into this application.

BACKGROUND OF THE INVENTION

The present invention relates to a disk-array device which configures a storage area network (SAN).

Conventionally, there has been disclosed a storage-area-network management system where an integrated management mechanism for integratedly controlling a storage area network (SAN) is set up. This management mechanism allows batch managements of zonings of switches and access managements between hosts and a storage device (U.S. patent application Publication No. 2001/0054093).

SUMMARY OF THE INVENTION

An inconvenience, however, has existed in the above-described system. Namely, there has occurred a situation where it is difficult to recognize and identify link-destination ports of fibre channels linked to the disk-array device of the storage device. This difficult situation has occurred in accompaniment with an expansion in the storage area network (SAN) environment and an increase in the switch devices for switching links of server devices via host bus adapters (HBAs) and the fibre channels.

Also, the storage area network (SAN) environment initially constructed on the client side is being changed on a day-by-day basis by such factors as the version-update. This has resulted in a situation where it is even more difficult to recognize and identify the link environment on the client side.

Accordingly, it is an object of the present invention to provide a disk-array device which allows the link environment of the storage area network (SAN) to be recognized and identified from the storage-device side.

In order to solve the above-described problems and accomplish the above-described object of the present invention, the disk-array device of the present invention includes a link-information management unit. The link-information management unit acquires respective link information among the server devices, the switch devices, and the storage device via the switch devices so as to manage the respective link information in a combined manner. This allows the disk-array device of the present invention to acquire in batch the respective link information among the server devices, the switch devices, and the storage device.

Also, the disk-array device of the present invention includes a collection/analysis unit. The collection/analysis unit retrieves and collects desired combined information of the link information from the link-information management unit so as to analyze the desired combined information. This allows the disk-array device of the present invention to collect and analyze the respective link information on the storage-device side.

Based on this configuration, the disk-array device of the present invention acquires the link information on the server devices with the switch devices, the link information on the switch devices with the server devices, and the link information on the switch devices with the storage device via the switch devices so as to manage the link information in a combined manner by the link-information management unit. Moreover, the disk-array device retrieves and collects desired combined information of the link information from the link-information management unit so as to analyze the desired combined information by the collection/analysis unit. As a result, the disk-array device is capable of recognizing and identifying the link environment of the storage area network (SAN). Also, the disk-array device of the present invention is capable of recognizing and identifying the link environment on the client side such as the version-update or a failure.

The disk-array device of the present invention is capable of acquiring in batch the respective link information among the server devices, the switch devices, and the storage device. Furthermore, the disk-array device is capable of collecting and analyzing the respective link information on the storage-device side. This makes it possible for the disk-array device to recognize and identify the link environment on the client side such as the introduction configuration or statistical information on the failure-occurrence frequency.

Other objects, features and advantages of the invention will become apparent from the following description of the embodiments of the invention taken in conjunction with the accompanying drawings.

BRIEF DESCRIPTION OF THE DRAWINGS

FIG. 6 is a diagram for illustrating a combination table for indicating the combination of the host bus adapter (HBA) drivers and the plural pieces of firmware of the FC switch devices;

FIG. 7 is a diagram for illustrating an example where status and count fields are added to an example of the support matrix;

FIG. 8 is a diagram for illustrating a displayed example of the support matrix;

FIG. 9 is a flowchart for illustrating the registration operation of the attribute information on the HBA and the attribute information on the FC switch device;

FIG. 10 is a flowchart for illustrating the collection operation of information such as the attribute information on the HBA;

FIG. 11 is a flowchart for illustrating the operation of the failure analysis in the HBA-information collection.

DESCRIPTION OF THE INVENTION

Hereinafter, using the drawings appropriately, the explanation will be given concerning embodiments of the present invention.

First, the explanation will be given regarding the configuration of a disk-array device according to an embodiment of the present invention.

Figure 1:
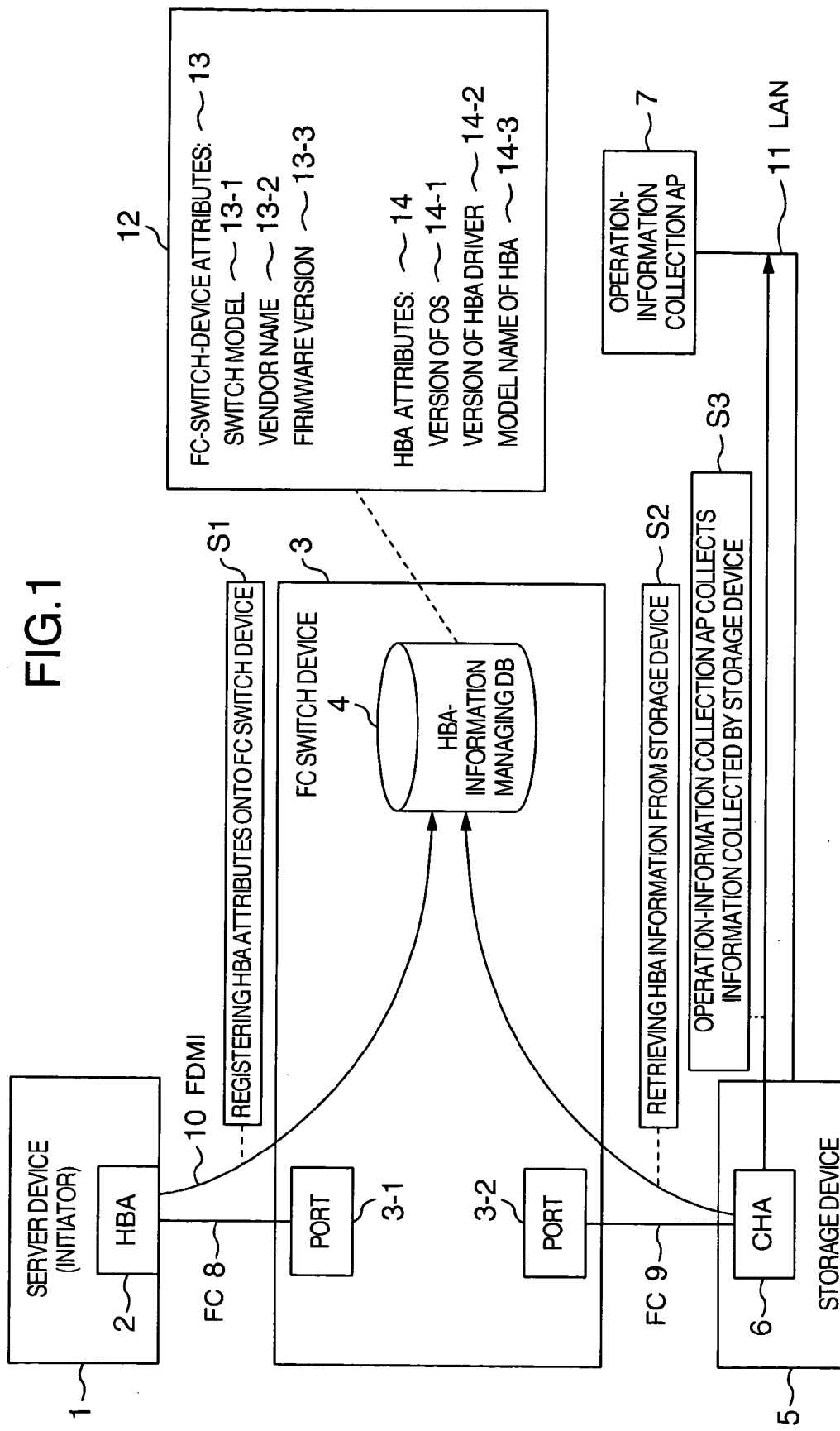
FIG. 1 is a diagram for illustrating the collection of host bus adapter (HBA) information by a disk-array device relating to the present invention.

FIG. 1 is a diagram for illustrating the collection of host bus adapter (HBA) information by the disk-array device relating to the present invention.

In FIG. 1, a host bus adapter (HBA) 2 of a server device 1 is linked to a port 3-1 of a FC switch device 3 via a fibre channel (FC) 8. Also, a port 3-2 of the FC switch device 3 is linked to a channel adapter (CHA) 6 of a storage device 5 via a fibre channel (FC) 9. The server device 1, the FC switch device 3, and the storage device 5 configure the disk-array device based on a storage area network (SAN). Also, the storage device 5 is linked to an operation-information collection application (AP) 7 via a local area network (LAN) 11. Here, the operation-information collection application (AP) 7, concretely, runs on a personal computer (PC).

Here, in the disk-array device according to the embodiment of the present invention, a host bus adapter (HBA) information managing database (DB) 4 for acquiring and managing link information on the storage area network (SAN) configuration is provided within the FC switch device 3.

Here, in accompaniment with an expansion in the storage area network (SAN) configuration and increases in the vendor and models of the host bus adapter (HBA) 2 of the server device 1 and the FC switch device 3, it is becoming increasingly difficult to recognize and identify the port of a link destination linked to the storage device 5.

Also, the client side, which has introduced the storage area network (SAN) configuration, carries out the upgrades for the driver of the host bus adapter (HBA) 2 of the server device 1 and the firmware of the FC switch device 3 from the configuration at the initial introduction present time. This, on the client side as well, has made it even more difficult to recognize and identify the storage area network (SAN) configuration at the present time. Moreover, when there has occurred a failure about the link property of the fibre channel (FC) 8 or 9, if it is wished to collect the link information on the storage area network (SAN) configuration as the failure information, there has existed no other method than to inquire and confirm the information of the client which has introduced the configuration.

Accordingly, in the disk-array device according to the embodiment of the present invention, the following collection operation of collecting host bus adapter (HBA) information will be set and executed.

Hereinafter, the explanation will be given regarding the collection operation of the host bus adapter (HBA) information in the disk-array device configured as described above.

In FIG. 1, in the disk-array device according to the embodiment of the present invention, with respect to the host bus adapter (HBA) 2 of the server device 1 and the FC switch device 3 which are linked to the storage device 5 and are compliant with the GS-4 Protocol of the Fibre Channel Protocols, a FDMI (Fabric Management Interface) 10 defined by the GS-4 Protocol is used. Furthermore, the host bus adapter (HBA) information managing database (DB) 4, which is used for registering therein attribute information 14 on the host bus adapter (HBA) 2 and attribute information 13 on the FC switch device 3, is provided on the FC switch device 3 in a manner where the information is collectable from the storage device 5.

Hereinafter, the explanation will be given concerning the respective steps indicating concrete operations.

First, the disk-array device according to the embodiment of the present invention registers the attribute information 14 on the host bus adapter (HBA) 2 into the host bus adapter (HBA) information managing database (DB) 4 of the FC switch device 3 from the host bus adapter (HBA) 2 of the server device 1 via the FDMI (Fabric Management Interface) 10 defined by the GS-4 Protocol (step S1). Also, at this time, the disk-array device according to the embodiment of the present invention registers the attribute information 13 on the FC switch device 3 into the HBA-information managing DB 4 from the port 3-1 of the FC switch device 3 via the FDMI 10. In the host bus adapter (HBA) information managing database (DB) 4, the link information as described above are managed in a combined manner.

The reasons why, in this way, the attribute information on the host bus adapter (HBA) is registered into the host bus adapter (HBA) information managing database (DB) 4 of the FC switch device 3 are as follows: The FDMI (Fabric Management Interface) 10 defined by the GS-4 Protocol guarantees that these pieces of information are acquirable. Also, the execution of the normal data-transfer steps finds it impossible to acquire failure information in the normal data transfer.

As the trigger for the above-described registration timing, a command issuing is selected which is executed at a time of setting the first-time link state of the driver for the host bus adapter (HBA) 2 of the server device 1 linked to the FC switch device 3 via the fibre channel (FC) 8. In this case, clicking on a specified check box allows the execution of the command issuing.

Here, as information 12 to be collected into the host bus adapter (HBA) information managing database (DB) 4, there exist the attribute information 13 on the FC switch device 3 and the attribute information 14 on the host bus adapter (HBA) 2. The attribute information 13 on the FC switch device 3 are, e.g., switch model 13-1, vendor name 13-2, and firmware version 13-3. Also, the attribute information 14 on the host bus adapter (HBA) 2 are, e.g., version 14-1 of the operating system (OS), version 14-2 of the driver for the host bus adapter (HBA) 2, and model name 14-3 of the host bus adapter (HBA) 2.

Next, the disk-array device according to the embodiment of the present invention performs the retrieval of the host bus adapter (HBA) information from the channel adapter (CHA) 6 of the storage device 5 to the host bus adapter (HBA) information managing database (DB) 4 of the FC switch device 3 (step S2). Here, desired information is retrieved from combined information of the link information managed within the host bus adapter (HBA) information managing database (DB) 4.

The reason why, in this way, the retrieval of the information is performed from the storage device 5 to the host bus adapter (HBA) information managing database (DB) 4 of the FC switch device 3 is as follows: According to the normal data-transfer process, it impossible to perform the retrieval of the information at the time of a failure in the normal data transfer.

The above-described retrieval timing is any one of the following timings: A time of linking the FC switch device 3 and the server device 1 to the storage device 5 via the storage area network (SAN), a recognition time from the server device 1 to the storage device 5, and a time before a file transfer from the server device 1 to the storage device 5.

Also, being not limited thereto, as the above-described retrieval timing may also be the time when the storage device 5 performs a re-recognition with respect to the server device 1 via the FC switch device 3. In this case, the storage device 5 reads the above-described information by a Read operation, then holding the information therein on a temporary basis. Next, at a transfer-capable time after that, the storage device 5 transfers the above-described information to the operation-information collection application (AP) 7.

Furthermore, from the channel adapter (CHA) 6 of the storage device 5 and via the local area network (LAN) 11, the retrieved information is collected into the operation-information collection application (AP) 7, then being used for the analysis (step S3).

The reason why, in this way, the retrieved information is collected to be analyzed into the operation-information collection application (AP) 7 from the storage device 5 is as follows: According to the normal data-transfer process, it impossible to perform the collection and analysis of the information at the time of a failure in the normal data transfer.

On account of this, the link information on the storage area network (SAN) configuration at the present time on the client side which has introduced the storage area network (SAN) configuration is made available at an early stage without making the inquiry to the vendor of the host bus adapter (HBA) 2 of the server device 1 and the FC switch device 3 and the client.

On account of this, when performing the version-update of the driver of the host bus adapter (HBA) 2, the client refers to the firmware of the FC switch device 3, thereby being capable of judging whether or not the link can be established even if the version-update has been performed. Also, when a failure has occurred, the combination of the driver and the firmware makes it possible to judge a location at which the failure has occurred.

Also, it is possible to perform in batch the version-updates of the host bus adapter (HBA) 2 and the FC switch device 3 on the storage-device 5 side. Also, it is made possible not to be able to perform in batch the version-updates of the host bus adapter (HBA) 2 and the FC switch device 3 on the server-device 1 side.

Also, at the time when the link failure with the storage device 5 has occurred, the condition, i.e., the client environment is made available at an early stage, allows the early-stage analysis and early-stage improvement of the failure location.

Moreover, the execution of the information collection on the storage area network (SAN) configuration allows the clarification of targets of evaluation from now on, and reducing number of man-hours for the evaluation.

Figure 2:
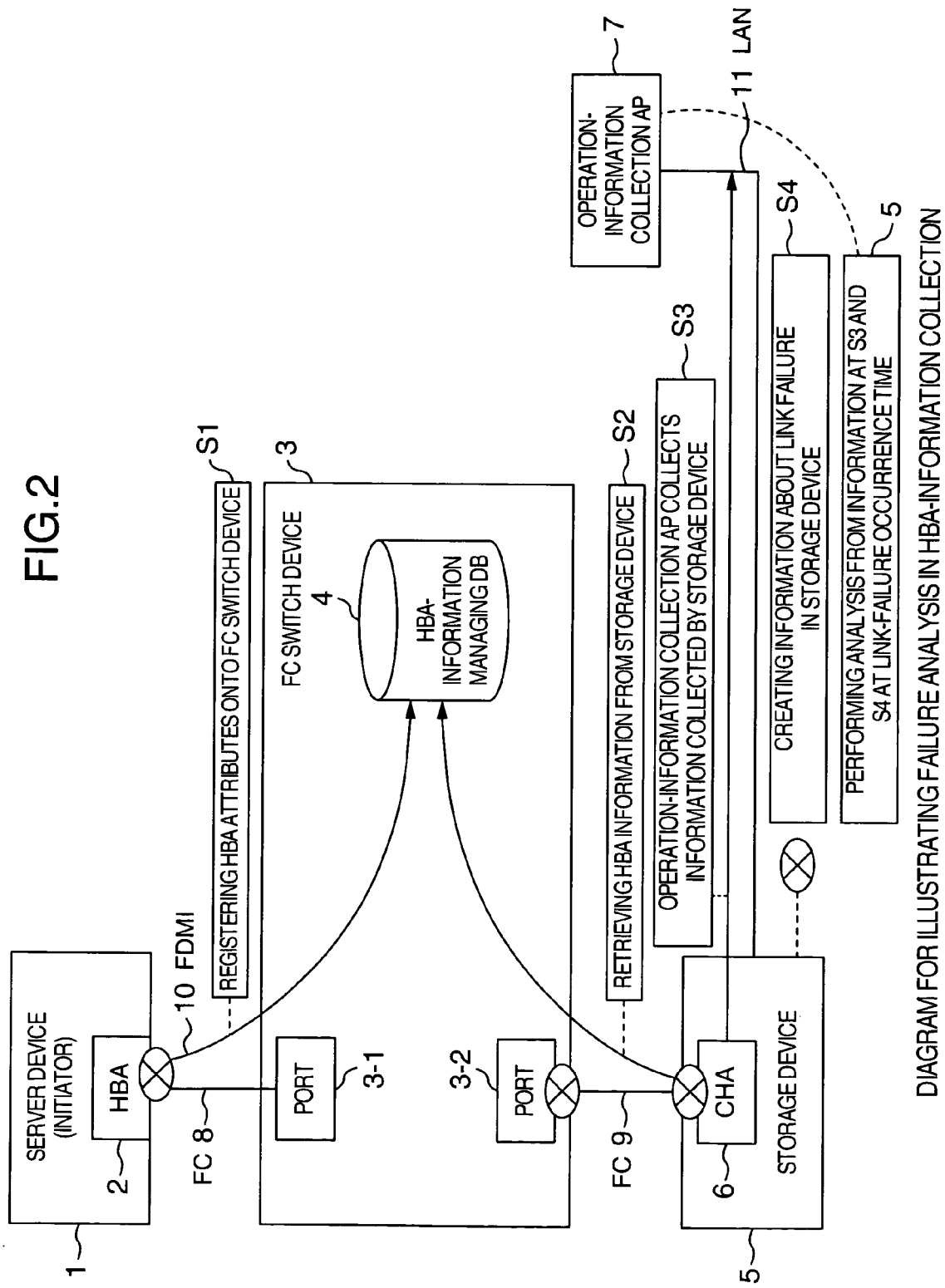
FIG. 2 is a diagram for illustrating the failure analysis in the collection of the host bus adapter (HBA) information.

FIG. 2 is a diagram for illustrating the failure analysis in the collection of the host bus adapter (HBA) information.

In the above-described case where the host bus adapter (HBA) 2 of the server device 1 is linked to the storage device 5 via the FC switch device 3, if a data-transfer timeout error has occurred, a function is added which tracks the development as to when and at which location the data-transfer timeout error has occurred. This addition makes it necessary to replace any one of the host bus adapter (HBA) 2, the FC switch device 3, and package locations configuring these devices.

Here, the data-transfer request has been made from the storage device 5 to the server device 1. However, at the occurrence of the error, since no data transfer is made, an error display is made on the storage device 5. Although, in this case, the storage device 5 is required to have collected the link information before the error occurrence, the storage device 5, depending on the situation, may collect the link information after the error occurrence.

As is the case with FIG. 1, the disk-array device according to the embodiment of the present invention registers the attribute information on the host bus adapter (HBA) into the host bus adapter (HBA) information managing database (DB) 4 of the FC switch device 3 from the host bus adapter (HBA) 2 of the server device 1 via the FDMI (Fabric Management Interface) 10 defined by the GS-4 Protocol (step S1). Next, the disk-array device performs the retrieval of the host bus adapter (HBA) information from the channel adapter (CHA) 6 of the storage device 5 to the host bus adapter (HBA) information managing database (DB) 4 of the FC switch device 3 (step S2). Still next, from the channel adapter (CHA) 6 of the storage device 5 and via the local area network (LAN) 11, the disk-array device collects the retrieved information into the operation-information collection application (AP) 7 and uses the information for the analysis (step S3). In view of the above-described circumstances, if the data-transfer timeout error occurs after these steps have been performed, the disk-array device performs the following operation:

In this case, from the channel adapter (CHA) 6 of the storage device 5 and via the local area network (LAN) 11, the operation-information collection application (AP) 7 creates information about the link failure in the storage device 5 (step S4). Here, the operation-information collection application (AP) 7 creates a threshold value of the time code at the time when check conditions have occurred in large number and a frame error has been detected in the storage device 5.

Furthermore, at the link-failure occurrence time, the operation-information collection application (AP) 7 performs the failure analysis from the retrieved information collected (step S3) and the created information about the link failure (step S4) (step S5). Here, the operation-information collection application (AP) 7 beforehand counts link failures on each port basis, thus managing the threshold value. If a link failure larger than a certain threshold value has occurred, the failure notice is issued, and simultaneously the configuration information is referred to. This allows the implementation of the analysis as to when and at which location the link failure has occurred.

Incidentally, concerning information at the time of the cut-off, when the server device 1 recognizes that the link to the storage area network (SAN) has been not established for a certain time-period, the storage device 5 judges that the host bus adapter (HBA) 2 of the server device 1 or the FC switch device 3 has been cut off from the storage area network (SAN) environment, and, based on this judgment, the HBA 2 or the server device 1 holds the old information.

On account of this, at the time of the failure occurrence about the link with the storage device 5 in the storage area network (SAN), the client environment is made available at an early stage. This condition makes it possible to recognize a necessity for the replacement of any one of the host bus adapter (HBA) 2, the FC switch device 3, and the package locations configuring these devices, thereby allowing the implementation of the early-stage analysis and early-stage improvement.

Figure 3:
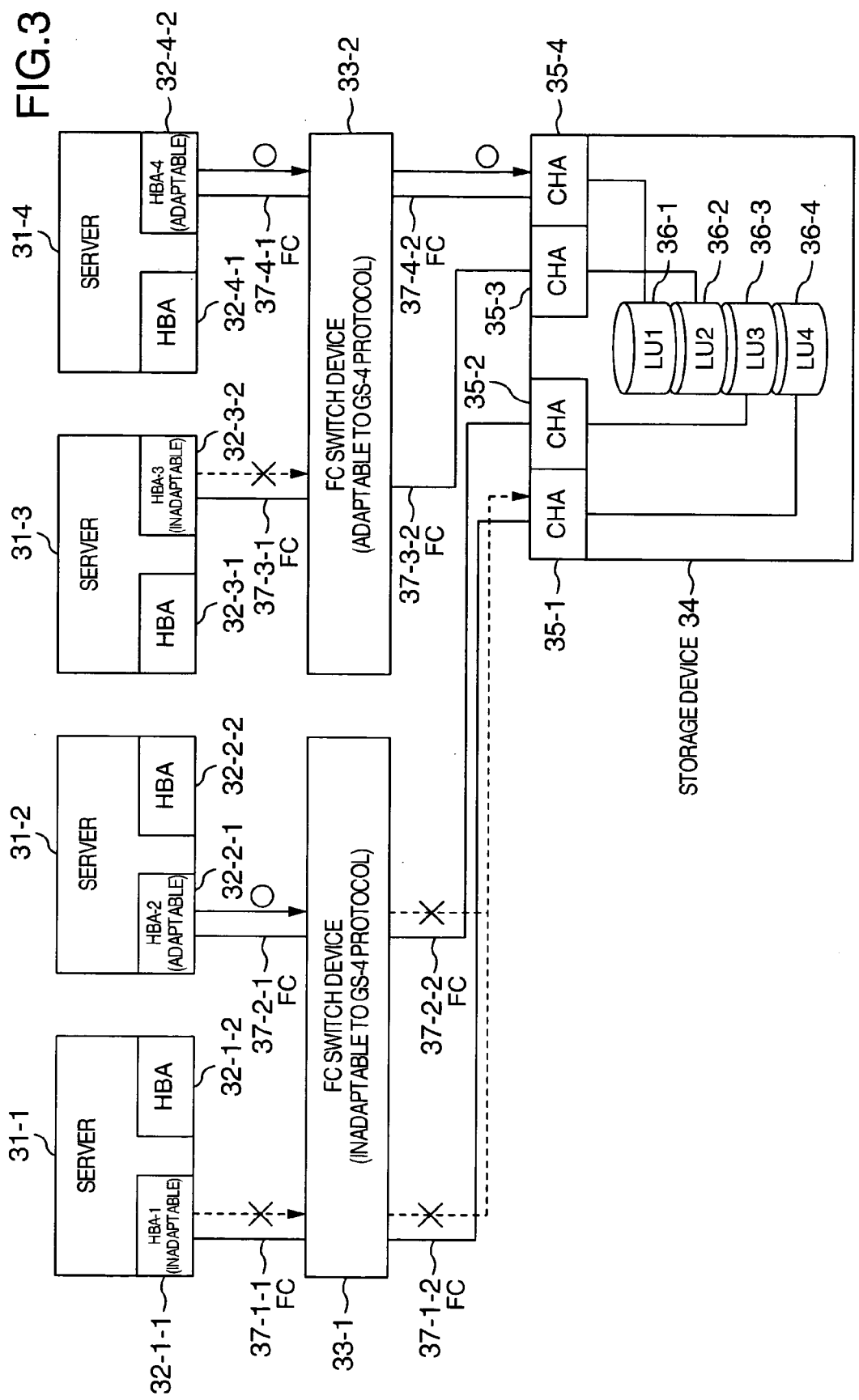
FIG. 3 is a diagram for illustrating the possibility/impossibility of the information collection by the combination of FC switch devices and host bus adapter (HBA) drivers.

FIG. 3 is a diagram for illustrating the possibility/impossibility of the information collection by the combination of FC switch devices and host bus adapter (HBA) drivers.

In FIG. 3, with respect to host bus adapter (HBA) drivers 32-1-1, 32-1-2, 32-2-1, 32-2-2, 32-3-1, 32-3-2, 32-4-1 and 32-4-2 of server devices 31-1, 31-2, 31-3 and 31-4, and FC switch devices 33-1 and 33-2 linked to a storage device 34, the possibility/impossibility of the use of the FDMI (Fabric Management Interface) defined by the GS-4 Protocol is determined depending on whether or not the host bus adapter (HBA) drivers and the FC switch devices are compliant with the GS-4 Protocol of the Fibre Channel Protocols. Here, as attribute information on the host bus adapters (HBAs), the version of the host bus adapter (HBA) drivers 32-1-1, 32-1-2, 32-2-1, 32-2-2, 32-3-1, 32-3-2, 32-4-1 and 32-4-2 is colleted into host bus adapter (HBA) information managing databases (DBs) of the FC switch devices 33-1 and 33-2 together with the version of the operating system (OS) of the server devices 31-1, 31-2, 31-3 and 31-4 and the model name of the host bus adapters (HBAs). A combination of these pieces of information is set up when, e.g., the version of each device is updated.

At this time, the host bus adapter (HBA) driver 32-1-1 of the server device 31-1 is linked to the FC switch device 33-1 via a fibre channel (FC) 37-1-1. The FC switch device 33-1 is linked to a channel adapter (CHA) 35-1 of the storage device 34 via a fibre channel (FC) 37-1-2. The channel adapter (CHA) 35-1 is linked to a logical storage area LU4 as a disk-array unit.

Also, the host bus adapter (HBA) driver 32-2-1 of the server device 31-2 is linked to the FC switch device 33-1 via a fibre channel (FC) 37-2-1. The FC switch device 33-1 is linked to a channel adapter (CHA) 35-2 of the storage device 34 via a fibre channel (FC) 37-2-2. The channel adapter (CHA) 35-2 is linked to a logical storage area LU3 as a disk-array unit.

Also, the host bus adapter (HBA) driver 32-3-2 of the server device 31-3 is linked to the FC switch device 33-2 via a fibre channel (FC) 37-3-1. The FC switch device 33-2 is linked to a channel adapter (CHA) 35-3 of the storage device 34 via a fibre channel (FC) 37-3-2. The channel adapter (CHA) 35-3 is linked to a logical storage area LU2 as a disk-array unit.

Also, the host bus adapter (HBA) driver 32-4-2 of the server device 31-4 is linked to the FC switch device 33-2 via a fibre channel (FC) 37-4-1. The FC switch device 33-2 is linked to a channel adapter (CHA) 35-4 of the storage device 34 via a fibre channel (FC) 37-4-2. The channel adapter (CHA) 35-4 is linked to a logical storage area LU1 as a disk-array unit.

Here, in FIG. 3, as indicated by "X" marks, the host bus adapter (HBA) driver 32-1-1 of the server device 31-1 and the FC switch device 33-1 are not compliant with the GS-4 Protocol of the Fibre Channel Protocols, and are inadaptable to the FDMI (Fabric Management Interface) defined by the GS-4 Protocol. Accordingly, the storage device 34 is incapable of collecting the link information of this combination.

Also, as indicated by "O" mark, the host bus adapter (HBA) driver 32-2-1 of the server device 31-2 is compliant with the GS-4 Protocol of the Fibre Channel Protocols, and is adaptable to the FDMI (Fabric Management Interface) defined by the GS-4 Protocol. As indicated by "X" mark, however, the FC switch device 33-1 is not compliant with the GS-4 Protocol of the Fibre Channel Protocols, and is inadaptable to the FDMI (Fabric Management Interface) defined by the GS-4 Protocol. Accordingly, the storage device 34 is incapable of collecting the link information of this combination.

Also, as indicated by "X" mark, the host bus adapter (HBA) driver 32-3-2 of the server device 31-3 is not compliant with the GS-4 Protocol of the Fibre Channel Protocols, and is inadaptable to the FDMI (Fabric Management Interface) defined by the GS-4 Protocol. Meanwhile, as indicated by "O" mark, the FC switch device 33-2 is compliant with the GS-4 Protocol of the Fibre Channel Protocols, and is adaptable to the FDMI (Fabric Management Interface) defined by the GS-4 Protocol. As a result, the storage device 34 is incapable of collecting the link information of this combination.

Also, as indicated by the "O" marks, the host bus adapter (HBA) driver 32-4-2 of the server device 31-4 and the FC switch device 33-2 are compliant with the GS-4 Protocol of the Fibre Channel Protocols, and are adaptable to the FDMI (Fabric Management Interface) defined by the GS-4 Protocol. Consequently, the storage device 34 is capable of collecting only the link information of this combination.

In the case where, in this way, the host bus adapter (HBA) drivers and the FC switch devices which are compliant with the GS-4 Protocol of the Fibre Channel Protocols and are adaptable to the FDMI (Fabric Management Interface) defined by the GS-4 Protocol and the host bus adapter (HBA) drivers and the FC switch devices which are not compliant therewith and are inadaptable thereto are mixed simultaneously, the previously-described operation-information collection application (AP) 7 plays a role of informing by the display whether each driver or device is adaptable or inadaptable.

The previously-described link-information acquisition function is a function whose precondition is the existence of the host bus adapter (HBA) drivers and the FC switch devices which are compliant with the GS-4 Protocol of the Fibre Channel Protocols. If a FC switch device is not compliant with the GS-4 Protocol, the previously-described link-information acquisition function cannot be applied to the storage area network (SAN) configuration including this FC switch device. Also, if a host bus adapter (HBA) driver is not compliant with the GS-4 Protocol, it is impossible to acquire information on this host bus adapter (HBA) driver.

Here, if there exits a FC switch device which is inadaptable to the GS-4 Protocol, it can be judged that the previously-described operation-information collection application (AP) 7 cannot collect the link information of this combination. In this case, the operation-information collection application (AP) 7 recommends that this FC switch device be changed to a one which is adaptable to the GS-4 Protocol, or informs by the display that the GS-4 Protocol has been unsupported.

Also, even when the host bus adapter (HBA) drivers and the FC switch devices are compliant with the GS-4 Protocol, if the characteristic function of the FC switch devices does not match a particular host bus adapter (HBA) driver, the operation-information collection application (AP) 7 acquires the collected link information of this combination. After that, the application (AP) 7 judges the presence or absence of the application of the characteristic function of the FC switch devices, then displaying its judgment result.

This makes it possible to encourage each vendor of the host bus adapter (HBA) drivers and the FC switch devices to recommend the support to the GS-4 Protocol.

Figure 4:
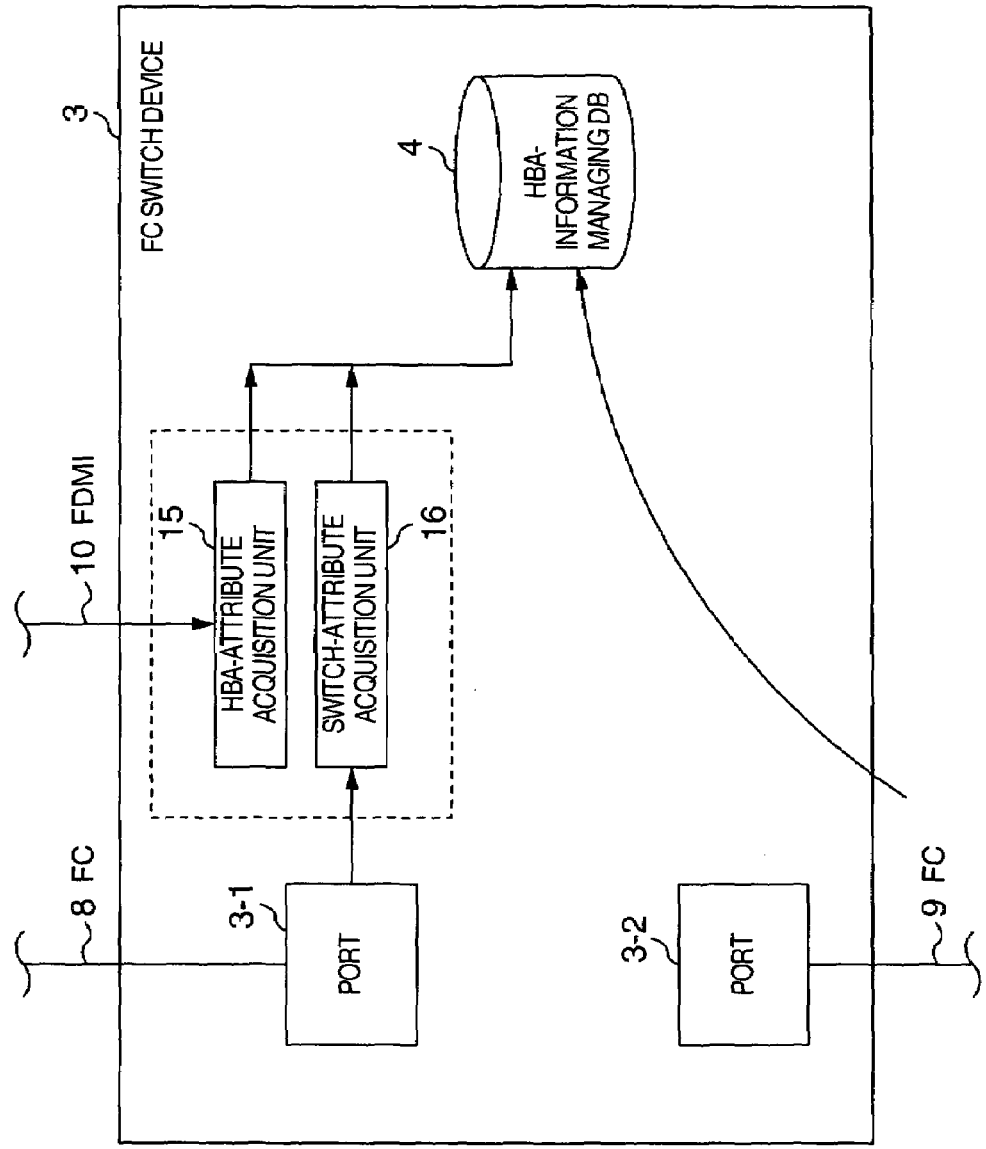
FIG. 4 is a diagram for illustrating the configuration of the FC switch device.

FIG. 4 is a diagram for illustrating the configuration of the FC switch device 3.

In the FC switch device 3 illustrated in FIG. 4, a HBA-attribute acquisition unit 15 has the following function: Acquiring the attribute information on the host bus adapter (HBA) 2 from the host bus adapter (HBA) driver, which is compliant with the GS-4 Protocol of the Fibre Channel Protocols and is adaptable to the FDMI (Fabric Management Interface) defined by the GS-4 Protocol, via the FDMI (Fabric Management Interface) 10 defined by the GS-4 Protocol, and registering the acquired attribute information into the host bus adapter (HBA) information managing database (DB) 4.

Also, a switch-attribute acquisition unit 16 has the following function: Acquiring the attribute information on the FC switch device 3 from the port 3-1 of the FC switch device 3 which is compliant with the GS-4 Protocol of the Fibre Channel Protocols and is adaptable to the FDMI (Fabric Management Interface) defined by the GS-4 Protocol, and registering the acquired attribute information into the host bus adapter (HBA) information managing database (DB) 4.

Here, the host bus adapter (HBA) information managing database (DB) 4 is configured such that the above-described attribute information on the host bus adapter (HBA) 2 and the attribute information on the FC switch device 3 can be accumulated into a storage device within the FC switch device 3 via the FDMI (Fabric Management Interface) 10 defined by the GS-4 Protocol.

Figure 5:
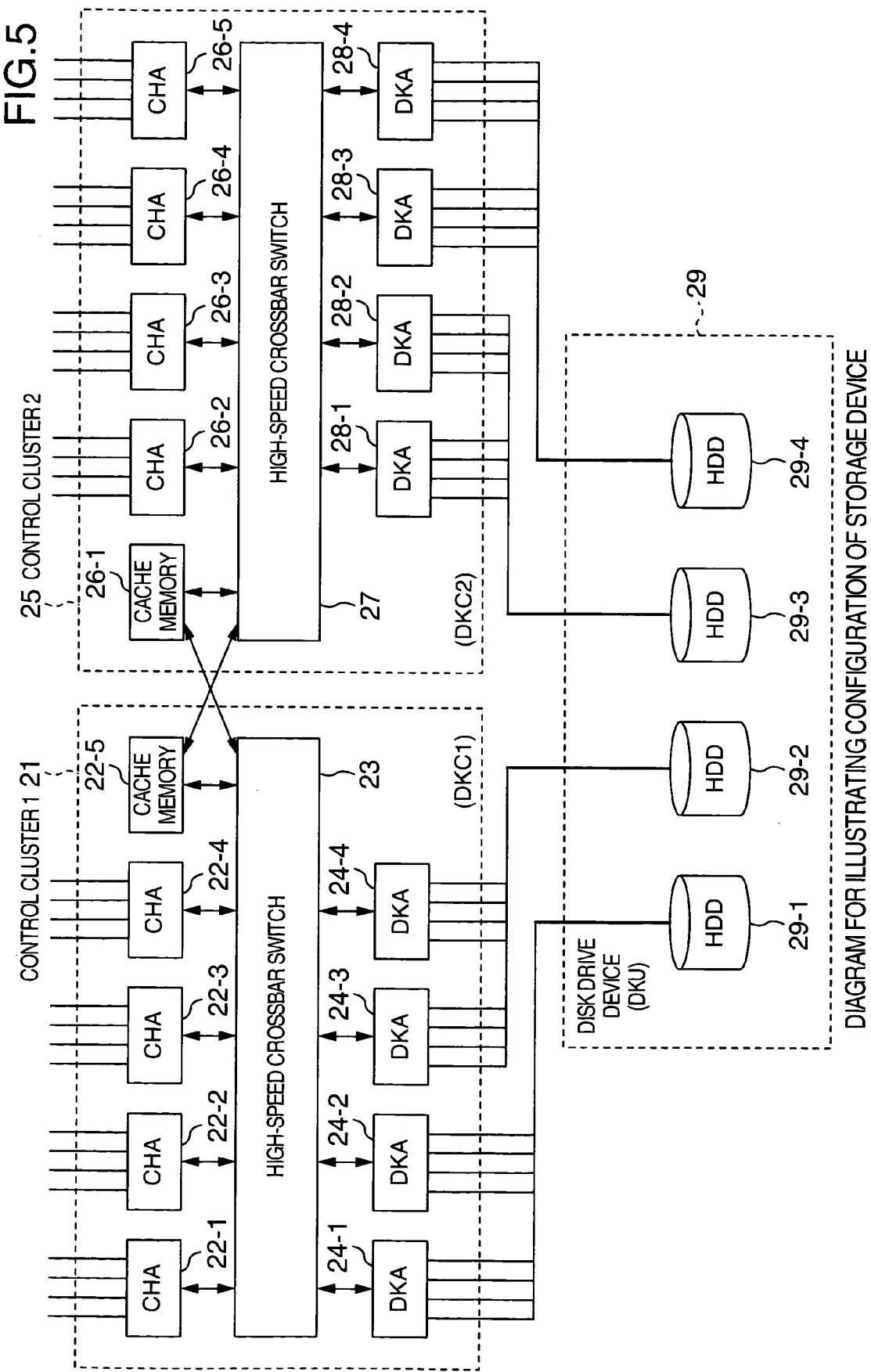
FIG. 5 is a diagram for illustrating the configuration of the storage device.

FIG. 5 is a diagram for illustrating the configuration of the storage device.

In FIG. 5, the storage device includes a control cluster 21 and a control cluster 25, which are configured as follows: The power-supply of the control cluster 21 and that of the control cluster 25 are made independent of each other. Simultaneously, the clusters are formed into a completely redundant structure which causes the clusters to perform a duplex processing. As a result, even if a failure has occurred in either of the systems, both of the control cluster 21 and the control cluster 25 are capable of operating normally.

The control cluster 21 is configured to include a channel adapter (CHA) 22-1 to a channel adapter (CHA) 22-4 and a cache memory 22-5, so that a Write command from the server device 1 will be received by the channel adapter (CHA) 22-1 to the channel adapter (CHA) 22-4 and so that the Write command will be registered into the cache memory 22-5.

The control cluster 21 is configured to include a disk adapter (DKA) 24-1 to a disk adapter (DKA) 24-4, and the contents of the cache memory 22-5 will be monitored all the time.

The control cluster 21 is configured to include a high-speed crossbar switch 23, so that the flow of data between the channel adapter (CHA) 22-1 to the channel adapter (CHA) 22-4 and the cache memory 22-5, and the disk adapter (DKA) 24-1 to the disk adapter (DKA) 24-4 will be switched.

The disk adapter (DKA) 24-1 to the disk adapter (DKA) 24-4 are configured to fetch written data from the cache memory 22-5 in accordance with the registered contents in the cache memory 22-5, and to write the written data into a hard disk drive (HDD) 29-1 to a hard disk drive (HDD) 29-2 of a disk drive device (DKU).

The control cluster 21 and the control cluster 25 form a single RAID (Redundant Arrays of Inexpensive Disks) group by integrating the hard disk drive (HDD) 29-1 to a hard disk drive (HDD) 29-4 in plural number. Then, the clusters 21 and 25 divide this RAID group logically, thereby configuring the logical storage areas LUs.

Incidentally, at the time of a data readout, the operation inverted to the one at the time of the above-described data Write is performed, and thus the explanation thereof will be omitted. Also, concerning the control cluster 25, basically the same operation as the one by the above-described control cluster 21 is performed, and thus the explanation thereof will also be omitted.

Hereinafter, the explanation will be given concerning the respective steps indicating the concrete operations, using each flowchart corresponding thereto.

FIG. 9 is a flowchart for illustrating the registration operation of the attribute information on the HBA and the attribute information on the FC switch device. FIG. 9 illustrates the steps of the registration operation of the attribute information on the HBA and the one on the FC switch device in FIG. 1.

In FIG. 9, first, the disk-array device according to the embodiment of the present invention registers the attribute information on the host bus adapter (HBA) into the host bus adapter (HBA) information managing database (DB) 4 of the FC switch device 3 from the host bus adapter (HBA) 2 of the server device 1 via the FDMI (Fabric Management Interface) 10 (step S11).

Also, at this time, the disk-array device according to the embodiment of the present invention registers the attribute information on the FC switch device into the HBA-information managing DB 4 from the port 3-1 of the FC switch device 3 via the FDMI 10 (step S12).

On account of this, in the host bus adapter (HBA) information managing database (DB) 4, the link information as described above are managed in a combined manner (step S13).

FIG. 10 is a flowchart for illustrating the collection operation of information such as the attribute information on the HBA. FIG. 10 illustrates the steps of the collection operation of the information such as the above-described attribute information on the HBA in FIG. 1.

In FIG. 10, first, the disk-array device according to the embodiment of the present invention registers the attribute information on the host bus adapter (HBA) into the host bus adapter (HBA) information managing database (DB) 4 of the FC switch device 3 from the host bus adapter (HBA) 2 of the server device 1 via the FDMI (Fabric Management Interface) 10 (step S21).

Next, the disk-array device according to the embodiment of the present invention performs the retrieval of the host bus adapter (HBA) information from the channel adapter (CHA) 6 of the storage device 5 to the host bus adapter (HBA) information managing database (DB) 4 of the FC switch device 3 (step S22).

Furthermore, from the channel adapter (CHA) 6 of the storage device 5 and via the local area network (LAN) 11, the retrieved information is collected into the operation-information collection application (AP) 7, then being used for the analysis (step S23).

FIG. 11 is a flowchart for illustrating the operation of the failure analysis in the HBA-information collection. FIG. 11 illustrates the steps of the failure-analysis operation in the HBA-information collection in FIG. 2.

In FIG. 11, the disk-array device according to the embodiment of the present invention registers the attribute information on the host bus adapter (HBA) into the host bus adapter (HBA) information managing database (DB) 4 of the FC switch device 3 from the host bus adapter (HBA) 2 of the server device 1 via the FDMI (Fabric Management Interface) 10 (step S31). Next, the disk-array device performs the retrieval of the host bus adapter (HBA) information from the channel adapter (CHA) 6 of the storage device 5 to the host bus adapter (HBA) information managing database (DB) 4 of the FC switch device 3 (step S32). Still next, from the channel adapter (CHA) 6 of the storage device 5 and via the local area network (LAN) 11, the disk-array device collects the retrieved information into the operation-information collection application (AP) 7 and uses the information for the analysis (step S33). If a data-transfer timeout error occurs after these steps have been performed, the disk-array device performs the following operation:

In this case, from the channel adapter (CHA) 6 of the storage device 5 and via the local area network (LAN) 11, the operation-information collection application (AP) 7 creates information about the link failure in the storage device 5 (step S34).

Moreover, at the link-failure occurrence time, the operation-information collection application (AP) 7 performs the failure analysis from the retrieved information collected (step S33) and the created information about the link failure (step S34) (step S35).

FIG. 6 is a diagram for illustrating a combination table for indicating the combination of the host bus adapter (HBA) drivers and the plural pieces of firmware of the FC switch devices. The items illustrated in FIG. 6 are defined as necessary conditions for combined information on the host bus adapter (HBA) drivers and the FC switch devices.

First, the information on the host bus adapter (HBA) drivers and the plural pieces of firmware of the FC switch devices are registered into the host bus adapter (HBA) information managing database (DB) 4 of the FC switch devices 3 via the FDMI (Fabric Management Interface) 10 illustrated in FIG. 1. This allows the FC switch devices 3 to acquire the combined information of these pieces of information. Next, the storage device 5 performs the retrieval of the information on the host bus adapter (HBA) drivers and the plural pieces of firmware of the FC switch devices from the channel adapter (CHA) 6 to the host bus adapter (HBA) information managing database (DB) 4 of the FC switch devices 3. This allows the operation-information collection application (AP) 7 to collect the retrieved information from the channel adapter (CHA) 6 of the storage device 5 via the local area network (LAN) 11.

Concerning the matching information on the combination of the host bus adapter (HBA) drivers and the plural pieces of firmware of the FC switch devices, concretely, the combination table is displayed in an in-batch manner on the monitor of the personal computer (PC) operated by the operation-information collection application (AP) 7. This makes it possible to provide the client with the compatibility matching information.

Regarding the host bus adapter (HBA) drivers and the plural pieces of firmware of the FC switch devices, the model names are classified based on, e.g., differences in the port numbers. If, however, the versions of the control-governing host bus adapter (HBA) drivers are the same as the versions of the control-governing plural pieces of firmware of the FC switch devices, the drivers and the plural pieces of firmware can be regarded as being equivalent to each other with respect to the link property of the fibre channels (FCs). Also, at the update times of these versions, the admission ranges are determined by the presence or absence of a change of the interface for the fibre channels (FCs).

Consequently, when considering from the standpoint of the link property of the fibre channels (FCs), the admission is carried out by taking into consideration the combination of the host bus adapter (HBA) drivers and the plural pieces of firmware of the FC switch devices. This is because it is impossible to admit all the host bus adapter (HBA) drivers and all the plural pieces of firmware of the FC switch devices.

In view of this situation, in FIG. 6, plural pieces of admission information 46 are simultaneously displayed. Here, the admission information 46 indicate which FC switch device 44's firmware 45's version matches the version of a driver 43 of a host bus adapter (HBA) 42 of a particular number 41. If there exists no version that exhibits the matching, a warning to the effect is displayed.

This admission 46 includes, e.g., approval based on GA (: General Admission), LA (: Limited-support Admission) for only a particular client, or LLA (: Labelage Limited-support Admission) which gives no admission but conjectures the version from the one close thereto.

Also, an in-operation count 47 field displays a count value of the in-operation admittance number, and a problem-occurrence count 48 field displays a count value of the problem-occurrence number.

Hereinafter, the explanation will be given regarding an example of the support matrix used for an actual display.

FIG. 7 is a diagram for illustrating an example where status and count fields are added to an example of the support matrix.

Concerning the compatibility matching information on the combination of the host bus adapter (HBA) drivers and the plural pieces of firmware of the FC switch devices, the combination of the respective versions of the host bus adapter (HBA) drivers and the respective versions of the plural pieces of firmware of the FC switch devices is displayed on the operation-information collection application (AP) 7 as a document-form admission performance-record support matrix. This compatibility matching information is saved on the operation-information collection application (AP) 7 by being formed into a database (DB). Concretely, the support matrix is displayed on the monitor of the personal computer (PC) operated by the operation-information collection application (AP) 7.

Hereinafter, using a flowchart, the explanation will be given concerning the creation steps of the support matrix illustrated in FIG. 7.

Figure 12:
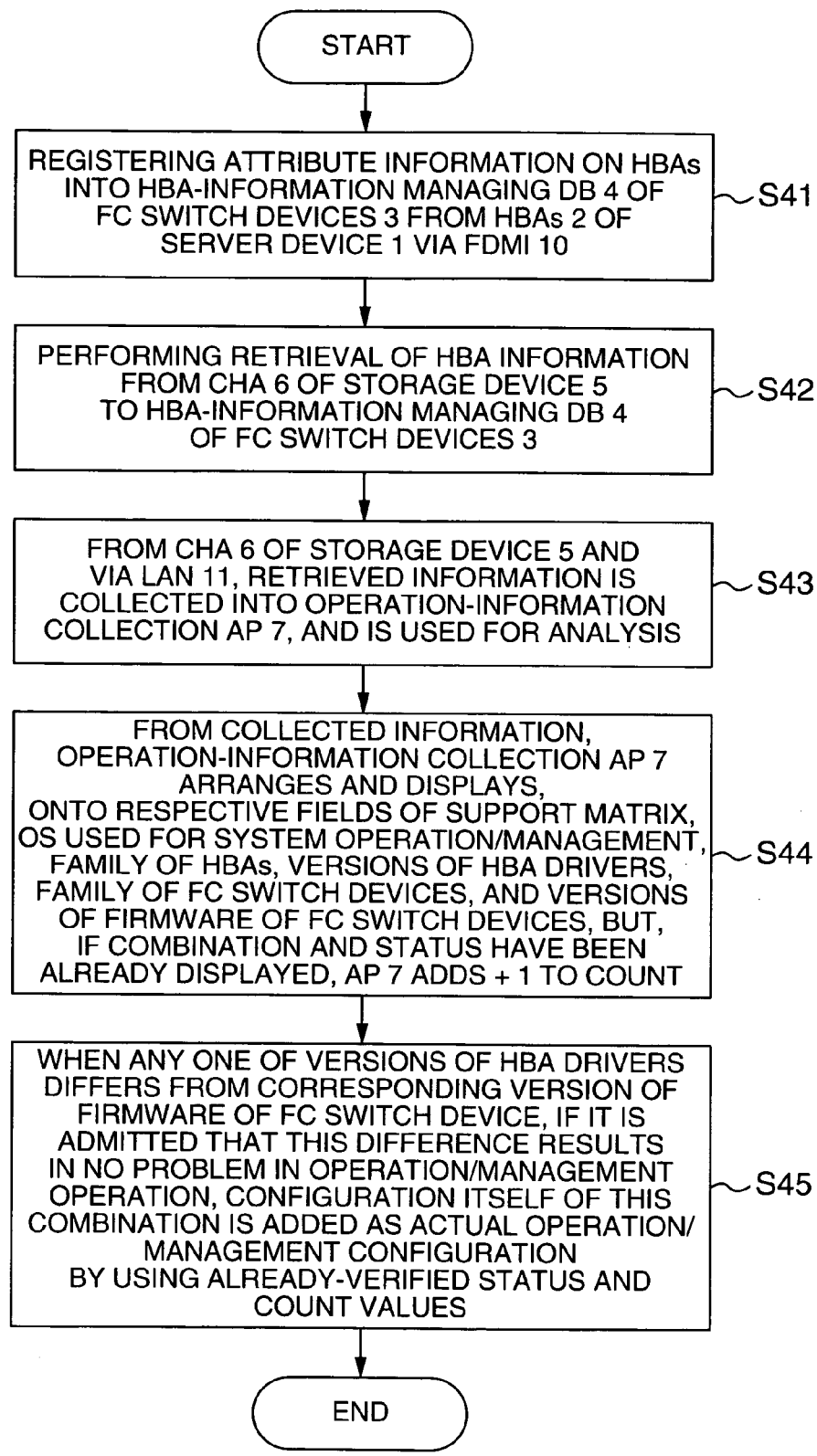
FIG. 12 is a flowchart for illustrating the creation operation of the support matrix.

FIG. 12 is the flowchart for illustrating the creation operation of the support matrix.

In FIG. 12, first, the disk-array device according to the embodiment of the present invention registers the attribute information on the host bus adapters (HBAs) into the host bus adapter (HBA) information managing database (DB) 4 of the FC switch devices 3 from the host bus adapters (HBAs) 2 of the server device 1 via the FDMI (Fabric Management Interface) 10 (step S41). Next, the disk-array device performs the retrieval of the host bus adapter (HBA) information from the channel adapter (CHA) 6 of the storage device 5 to the host bus adapter (HBA) information managing database (DB) 4 of the FC switch devices 3 (step S42). Still next, from the channel adapter (CHA) 6 of the storage device 5 and via the local area network (LAN) 11, the disk-array device collects the retrieved information into the operation-information collection application (AP) 7 and uses the information for the analysis (step S43). After these steps have been performed, the operation-information collection application (AP) 7 collects the configuration information on the storage device 5.

Next, from the collected information on the host bus adapter (HBA) drivers and the plural pieces of firmware of the FC switch devices, and the collected configuration information on the storage device 5, the operation-information collection application (AP) 7 performs the following operation:

First, the operation-information collection application (AP) 7, from the collected information, arranges and displays the following respective information onto respective fields of the support matrix: Operating system (OS) 51 used for the system operation/management, family 52 of the host bus adapter (HBA) for indicating model name, version 53 of the host bus adapter (HBA) driver, family 54 of the FC switch device for indicating model name, and version 55 of the firmware of the FC switch device. If, however, this combination has been already arranged and displayed on the respective fields of the support matrix and thus a status 56 field has been already displayed thereon, the application (AP) 7 adds +1 to a count 57 field (step S44).

Moreover, in the case where any one of the versions 53 of the host bus adapter (HBA) drivers differs from the corresponding version 55 of the firmware of the FC switch device, if it can be admitted that this difference results in no problem in the operation/management operation, the configuration itself of this combination is added as an actual operation/management configuration (step S45). Consequently, making reference to the already-verified status 56 and the values of the count 57 makes it possible to recommend the configuration of a better combination where the compatibility matches with each other.

Also, in the case of the configuration of a combination where this combination has been not arranged and displayed on the respective fields of the support matrix, the configuration itself of that combination is added as the actual operation/management configuration.

In FIG. 7, in the case of the following conditions, the status 56 has been already verified, and +1 is added to the count 57: The operating system (OS) 51 is OS A, the family 52 of the host bus adapter (HBA) is HBA A, the version 53 of the host bus adapter (HBA) driver is 5.2.1, the family 54 of the FC switch device is FC A, and the version 55 of the firmware of the FC switch device is 3.1.1 h.

Also, in the case of the following conditions, although the status 56 is not verified in the combination, an admission performance-record exists by the conjecture, and thus +1 is added to the count 57: The operating system (OS) 51 is OS A, the family 52 of the host bus adapter (HBA) is HBA A, the version 53 of the host bus adapter (HBA) driver is 5.3.07, the family 54 of the FC switch device is FC A, and the version 55 of the firmware of the FC switch device is 3.0.2 h. Here, the reason for the recognition that the performance-record exists by the conjecture is that, although no verification directly exists in this combination, this combination can be admitted as the performance-record by performing the conjecture from the other already-verified combinations indicated above.

In this case, when the version 55 of the firmware of the FC switch device is 3.1.1 h, the status 56 has been already verified, and the count 57 is equal to +1. Consequently, this combination is more recommendable. Incidentally, if the driver and device are not compliant with the GS-4 Protocol, the status 56 displays an unsupported configuration.

Furthermore, a combination whose version-update frequency is comparatively high may be displayed in a priority display field so as to indicate this frequency characteristic. Meanwhile, a combination whose version-update frequency is comparatively low may be displayed in a fixed display field.

FIG. 8 is a diagram for illustrating a displayed example of the support matrix.

In FIG. 8, the following respective information are displayed onto the respective fields of the support matrix: Host bus adapter (HBA) 61 for indicating model name, version 62 of the host bus adapter (HBA) driver, micro code 63 for indicating version of the firmware of the storage device 5, version 64 of the firmware of the server device, version 65 of the firmware of the FC switch device, cascade 66 for indicating the link number of the FC switch device, interface 67 of the storage device 5, topology 68 for indicating interface mode of the storage device 5, topology 69 for indicating interface mode of the host bus adapter (HBA) driver, and status code 70.

Here, if, as a particular user's purpose, the host bus adapter (HBA) 61 for indicating the model name is used for a particular user indicated in the lowest field, a type of the adapter specific thereto can be configured to be added as indicated on another page 1 in a note field 71. Concretely, the support matrix is displayed on the monitor of the personal computer (PC) operated by the operation-information collection application (AP) 7.

This allows the execution of comparison between a combination configuration of targets to be evaluated and a combination configuration whose evaluation has been already done.

Also, even in the case of no evaluation, it becomes possible to make available and recognize information on an actual operation/management configuration already introduced by the user. This allows the implementation of reflection of this information on the evaluation.

Furthermore, in the case of a combination which does not exist in the evaluation performance-record support matrix but includes an actual introduction configuration, the conjecture is performed assuming that the evaluation has been already carried out. This allows the implementation of evaluation of another combination.

Also, it becomes possible to reduce the number of man-hours for evaluation and targets to be evaluated.

In the above-described embodiment, the example has been given where the information database for registering therein the attribute information on the host bus adapter (HBA) and the attribute information on the FC switch device is provided on the FC switch device in a manner where the information is collectable from the storage device. Being not limited to the storage device, however, the information may be made collectable from the operation-information collection application (AP) 7 to the information database on the FC switch device which has registered therein the attribute information on the host bus adapter (HBA) and the attribute information on the FC switch device. Also, being not limited to the above-described link information, the driver information on the crossbar switches and disks within the storage device 5 may also be collected and managed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A disk-array device where a storage device is connected to a server device on a network via a switch device, said disk-array device comprising:
    link-information management means for acquiring through an interface of said disk-array device respective link information among said server device, said switch device, and said storage device via said switch device so as to manage said link information in a combined manner; and
    collection/analysis means for retrieving and collecting desired combined information of said link information from said link-information management means so as to analyze said desired combined information, wherein link information includes attribute information of an adaptor of said server device, said switch device, or an adaptor of said storage device, and said attribute information includes a model number and a version number of a driving software or firmware, wherein concerning the compatibility about a link of the version of a host bus adapter (HBA) driver of said server device and the version of firmware of said switch device, an already-verified combination table is displayed in an in-batch manner.

2. The disk-array device according to claim 1, wherein said switch device being configured by a storage area network (SAN) linked to said storage-device side and being used for switching between links via fibre channels,
said link information on said server device being attribute information on a host bus adapter (HBA) of said server device, said server device being linked to said switch device via said fibre channel.

3. The disk-array device according to claim 2, wherein said host bus adapter (HBA) of said server device and said switch device are compliant with the GS-4 Protocol of the Fibre Channel Protocols,
a FDMI (Fabric Management Interface) defined by said GS-4 Protocol is used, and thereby an information database for registering therein said attribute information on said host bus adapter (HBA) and said attribute information on said switch device is provided on said switch device in a manner where said information is collectable from said storage device.

4. The disk-array device according to claim 1, wherein said link information on said switch device and said link information on said host bus adapter (NBA) of said server device are collected from said storage-device side with a predetermined timing,
said switch device being configured by a storage area network (SAN) linked to said storage device and being used for switching between links via fibre channels, said server device being linked to said switch device via said fibre channel.

5. The disk-array device according to claim 4, wherein said timing is any one of a time of linking said switch device and said server device to said storage device via said storage area network (SAN), a time of recognition from said server device to said storage device, and a time before a file transfer from said server device to said storage device.

6. The disk-array device according to claim 1, wherein, at a failure-occurrence time about a link of said switch device and said server device to said storage device via a storage area network (SAN), a failure location is separated and classified based on said combined information of said link information.

7. The disk-array device according to claim 1, wherein the admission of said combination table includes General Admission, Limited-support Admission, or Labelage Limited-support Admission.

8. The disk-array device according to claim 1, wherein the storage device comprises:
a plurality of channel adapters configured to receive data from the switching device,
a cache memory,
a plurality of disk adapters,
a crossbar switch device operatively connected between the plurality of channel adapters, the cache memory and the plurality of disk adapters and configured so that the data from the plurality of channel adapters is stored in the cache memory and the data in the cache memory is outputted to the plurality of disk adapters, and
a plurality of hard disk drives each operatively connected to at least one corresponding disk adapter from the plurality of disk adapters and configured to receive the data through the plurality of disk adapters.

9. A disk-array device where a storage device is connected to a server device on a network via a switch device, said disk-array device comprising:
link-information management means for acquiring through an interface of said disk-array device respective link information among said server device, said switch device, and said storage device via said switch device so as to manage said link information in a combined manner, and
collection/analysis means for retrieving and collecting desired combined information of said link information from said link-information management means so as to analyze said desired combined information, wherein
link information includes attribute information of an adaptor of said server device, said switch device, or an adaptor of said storage device, and said attribute information includes a model number and a version number of a driving software or firmware, wherein, based on a state on said server-device side linked to said switch device via a fibre channel, said link information is transferred from said server device to said switch device with a predetermined timing, and
as the trigger for said timing, a command issuing is selected which is executed at a time of setting said link state of said host bus adapter (HBA) driver of said server device linked to said switch device via said fibre channel.

10. The disk-array device according to claim 9, wherein said switch device being configured by a storage area network (SAN) linked to said storage-device side and being used for switching between links via fibre channels,
said link information on said server device being attribute information on a host bus adapter (HBA) of said server device, said server device being linked to said switch device via said fibre channel.

11. The disk-array device according to claim 10, wherein said host bus adapter (HBA) of said server device and said switch device are compliant with the GS-4 Protocol of the Fibre Channel Protocols,
a FDMI (Fabric Management Interface) defined by said GS-4 Protocol is used, and thereby an information database for registering therein said attribute information on said host bus adapter (HBA) and said attribute information on said switch device is provided on said switch device in a manner where said information is collectable from said storage device.

12. The disk-array device according to claim 9, wherein said link information on said switch device and said link information on said host bus adapter (HBA) of said server device are collected from said storage-device side with a predetermined timing,
said switch device being configured by a storage area network (SAN) linked to said storage device and being used for switching between links via fibre channels, said server device being linked to said switch device via said fibre channel.

13. The disk-array device according to claim 12, wherein said timing is any one of a time of linking said switch device and said server device to said storage device via said storage area network (SAN), a time of recognition from said server device to said storage device, and a time before a file transfer from said server device to said storage device.

14. The disk-array device according to claim 9, wherein at a failure-occurrence time about a link of said switch device and said server device to said storage device via a storage area network (SAN), a failure location is separated and classified based on said combined information of said link information.

15. The disk-array device according to claim 9, wherein the admission of said combination table includes General Admission, Limited-support Admission, or Labelage Limited-support Admission.

16. The disk-array device according to claim 9, wherein the storage device comprises:
   a plurality of channel adapters configured to receive data from the switching device,
   a cache memory,
   a plurality of disk adapters,
   a crossbar switch device operatively connected between the plurality of channel adapters, the cache memory and the plurality of disk adapters and configured so that the data from the plurality of channel adapters is stored in the cache memory and the data in the cache memory is outputted to the plurality of disk adapters, and
   a plurality of hard disk drives each operatively connected to at least one corresponding disk adapter from the plurality of disk adapters and configured to receive the data through the plurality of disk adapters.

* * * * *